US007085811B2

(12) United States Patent
Sansone et al.

(10) Patent No.: US 7,085,811 B2
(45) Date of Patent: *Aug. 1, 2006

(54) SENDER ELECTED MESSAGING SERVICES

(75) Inventors: Ronald P. Sansone, Weston, CT (US);
Robert A. Cordery, Danbury, CT (US);
Donald G. Mackay, Roxbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 850 days.

This patent is subject to a terminal disclaimer.

(21) Appl. No.: 09/818,721

(22) Filed: Mar. 27, 2001

(65) Prior Publication Data
US 2002/0143880 A1 Oct. 3, 2002

(51) Int. Cl.
G06F 15/16 (2006.01)

(52) U.S. Cl. .................. 709/206; 709/203; 700/90; 382/101

(58) Field of Classification Search ........ 709/203–206, 709/217, 224, 236, 239; 379/216, 67, 88, 379/211, 93; 705/26, 401, 50; 358/402, 358/1.15, 440; 713/201; 380/282; 370/524; 370/392; 382/101; 700/90, 226; 707/9; 718/104; 715/515
See application file for complete search history.

(56) References Cited

U.S. PATENT DOCUMENTS

| 4,037,956 | A |   | 7/1977 | McKeen, Jr. |
| 4,962,532 | A |   | 10/1990 | Kasiraj et al. |
| 5,031,223 | A | * | 7/1991 | Rosenbaum et al. ........ 382/101 |
| 5,079,714 | A |   | 1/1992 | Manduley et al. |
| 5,086,300 | A |   | 2/1992 | Ashmore |
| 5,115,326 | A | * | 5/1992 | Burgess et al. ............. 358/440 |
| 5,276,901 | A | * | 1/1994 | Howell et al. ................ 707/9 |
| 5,293,250 | A | * | 3/1994 | Okumura et al. ........... 358/402 |
| 5,400,335 | A | * | 3/1995 | Yamada ....................... 370/524 |
| 5,612,889 | A |   | 3/1997 | Pintsov et al. .......... 364/478.14 |
| 5,636,038 | A |   | 6/1997 | Lynt et al. |

(Continued)

FOREIGN PATENT DOCUMENTS

CA 1178711 A 11/1984

(Continued)

OTHER PUBLICATIONS

The Session Initiation Protocol: Internet-Centric Signaling—Schulzrinne, al. (2000) ; www.cs.columbia.edu/~jdrosen/papers/commag_final.pdf.*

(Continued)

Primary Examiner—Thong Vu
(74) Attorney, Agent, or Firm—Ronald Reichman; Angelo N. Chaclas

(57) ABSTRACT

A method that enables the recipient to receive notification of the letters, flats and/or packages (mail) that the recipient is going to receive prior to the delivery of the mail. The recipient is then able to inform a post or courier, e.g., Federal Express®, Airborne®, United Parcel Service®, DHL®, etc., of the manner in which the recipient would like the mail delivered if the sender elects to permit the recipient to divert the mail. The post and courier hereinafter will be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the post e-mail or fax the contents of the envelope to the recipient and/or parties designated by the recipient.

6 Claims, 8 Drawing Sheets

U.S. PATENT DOCUMENTS

| | | | |
|---|---|---|---|
| 5,648,916 A * | 7/1997 | Manduley | 700/90 |
| 5,737,729 A * | 4/1998 | Denman | 705/401 |
| 5,790,790 A | 8/1998 | Smith et al. | |
| 5,794,221 A * | 8/1998 | Egendorf | 705/40 |
| 5,825,865 A * | 10/1998 | Oberlander et al. | 379/211.02 |
| 5,838,768 A | 11/1998 | Sumar et al. | 379/89 |
| 5,862,223 A * | 1/1999 | Walker et al. | 705/50 |
| 5,872,925 A * | 2/1999 | Han | 709/206 |
| 5,872,926 A | 2/1999 | Levac et al. | |
| 5,943,408 A * | 8/1999 | Chen et al. | 379/216.01 |
| 5,944,786 A * | 8/1999 | Quinn | 709/206 |
| 5,974,449 A | 10/1999 | Chang et al. | |
| 5,987,508 A * | 11/1999 | Agraharam et al. | 709/217 |
| 6,020,980 A * | 2/2000 | Freeman | 358/402 |
| 6,026,416 A * | 2/2000 | Kanerva et al. | 715/515 |
| 6,044,362 A | 3/2000 | Neely | |
| 6,047,272 A | 4/2000 | Biliris et al. | |
| 6,052,442 A * | 4/2000 | Cooper et al. | 379/88.19 |
| 6,058,420 A * | 5/2000 | Davies | 709/224 |
| 6,061,448 A * | 5/2000 | Smith et al. | 380/282 |
| 6,061,790 A * | 5/2000 | Bodnar | 713/171 |
| 6,064,995 A | 5/2000 | Sansone et al. | |
| 6,072,862 A | 6/2000 | Srinivasan | 379/100.08 |
| 6,073,165 A * | 6/2000 | Narasimhan et al. | 709/206 |
| 6,081,899 A * | 6/2000 | Byrd | 713/201 |
| 6,085,231 A * | 7/2000 | Agraharam et al. | 709/206 |
| 6,105,052 A * | 8/2000 | Okamura | 718/104 |
| 6,108,688 A * | 8/2000 | Nielsen | 709/206 |
| 6,125,170 A * | 9/2000 | Sawaya | 379/93.19 |
| 6,259,533 B1 * | 7/2001 | Toyoda et al. | 358/1.15 |
| 6,273,267 B1 | 8/2001 | Tamamoto et al. | |
| 6,285,777 B1 * | 9/2001 | Kanevsky et al. | 382/101 |
| 6,289,323 B1 | 9/2001 | Gordon et al. | |
| 6,293,037 B1 | 9/2001 | Spada et al. | |
| 6,321,211 B1 * | 11/2001 | Dodd | 705/26 |
| 6,333,973 B1 * | 12/2001 | Smith et al. | 379/88.12 |
| 6,343,327 B1 * | 1/2002 | Daniels et al. | 709/239 |
| 6,347,305 B1 * | 2/2002 | Watkins | 705/26 |
| 6,390,921 B1 | 5/2002 | Busch et al. | |
| 6,405,319 B1 * | 6/2002 | Arnold et al. | 713/201 |
| 6,411,393 B1 * | 6/2002 | Wakasugi | 358/1.15 |
| 6,427,164 B1 | 7/2002 | Reilly | |
| 6,434,603 B1 * | 8/2002 | Tsuji et al. | 709/206 |
| 6,459,364 B1 | 10/2002 | Gupta | |
| 6,527,170 B1 | 3/2003 | Gordon et al. | |
| 6,527,178 B1 | 3/2003 | Gordon et al. | |
| 6,532,489 B1 * | 3/2003 | Merchant | 709/206 |
| 6,542,268 B1 * | 4/2003 | Rotolo et al. | 369/44.23 |
| 6,542,584 B1 | 4/2003 | Sherwood et al. | |
| 6,549,612 B1 * | 4/2003 | Gifford et al. | 379/67.1 |
| 6,604,132 B1 * | 8/2003 | Hitt | 709/206 |
| 6,621,892 B1 * | 9/2003 | Banister et al. | 379/88.14 |
| 6,633,630 B1 * | 10/2003 | Owens et al. | 379/93.24 |
| 6,647,385 B1 | 11/2003 | Seestrom et al. | |
| 6,697,858 B1 * | 2/2004 | Ezerzer et al. | 709/224 |
| 6,710,894 B1 * | 3/2004 | Ogawa | 358/1.15 |
| 6,711,154 B1 * | 3/2004 | O'Neal | 370/352 |
| 6,721,784 B1 * | 4/2004 | Leonard et al. | 709/206 |
| 6,741,724 B1 | 5/2004 | Bruce et al. | |
| 6,775,422 B1 * | 8/2004 | Altman | 382/305 |
| 6,785,710 B1 * | 8/2004 | Kikinis | 709/206 |
| 6,816,602 B1 * | 11/2004 | Coffelt et al. | 382/101 |
| 6,839,843 B1 * | 1/2005 | Bacha et al. | 713/176 |
| 6,842,772 B1 * | 1/2005 | Delaney et al. | 709/206 |
| 6,848,006 B1 * | 1/2005 | Hermann | 709/239 |
| 6,868,083 B1 * | 3/2005 | Apostolopoulos et al. | 370/392 |
| 6,981,023 B1 * | 12/2005 | Hamilton et al. | 709/206 |
| 2001/0021261 A1 | 9/2001 | Koga et al. | |
| 2001/0056463 A1 * | 12/2001 | Grady et al. | 709/203 |
| 2002/0002590 A1 | 1/2002 | King et al. | |
| 2002/0042808 A1 | 4/2002 | Smith et al. | |
| 2002/0087641 A1 * | 7/2002 | Levosky | 709/206 |
| 2002/0095306 A1 | 7/2002 | Smith et al. | |
| 2002/0143431 A1 * | 10/2002 | Sansone | 700/226 |
| 2002/0143715 A1 * | 10/2002 | Sansone | 705/406 |
| 2002/0165729 A1 | 11/2002 | Kuebert et al. | |
| 2003/0177067 A1 * | 9/2003 | Cowell et al. | 705/14 |
| 2005/0216346 A1 * | 9/2005 | Kusumoto et al. | 705/14 |

FOREIGN PATENT DOCUMENTS

| | | |
|---|---|---|
| DE | 19745641 A1 | 11/1999 |
| EP | 0 375 139 A2 | 11/1989 |
| EP | 0 465 011 A2 | 1/1992 |
| EP | 1063602 A1 | 12/2002 |
| WO | WO 99/21330 | 10/1998 |
| WO | WO 02/01434 | 1/2002 |
| WO | WO 02/42979 | 5/2002 |

OTHER PUBLICATIONS

TURMS: A Non-invasive Certified Email System—Nita-Rotaru ; www.cnds.jhu.edu/~crisn/papers/turms.ps.gz*

EmailValet: Learning User Preferences for Wireless Email—Macskassy, Dayanik, Hirsh (1999) ; www-ai.cs.uni-dortmund.de/EVENTS/IJCAI99-MLIF/papers/macscassy.ps.gz.*

Formal Development of Secure Email—Zhou, Kuo, Older, Chin (1999) ; web.syr.edu/~dzhou/papers/hicss99.ps.gz.*

Practical Protocols For Certified Electronic Mail—Deng, Gong, Lazar, Wang (1996) ; java.sun.com/people/gong/papers/certified-email.ps.gz.*

POST: A secure, resilient, cooperative messaging system—Alan Mislove Ansley; www.usenix.org/events/hotos03/tech/full_papers/mislove/mislove.pdf.*

Formal Analysis of a Secure Communication Channel: Secure..—Dan Zhou ; ocelot.cat.syr.edu/~danzhou/papers/fm99.ps.*

An Efficient Implementation Scheme of Concurrent Object-Oriented..—Taura (1993) ; ftp.yl.is.s.u-tokyo.ac.jp/pub/papers/ppopp93-multicomputer-letter.ps.gz.*

Pin-down Cache: A Virtual Memory Management..—Tezuka, O'Carroll.. (1998) ; www.rwcp.or.jp/pm/../papers/tr97006.ps.gz.*

Linux Magazine | Jul. 1999 | FEATURES | Secrets Inside the Linux Kernel Revealed; www.linux-mag.com/1999-07/kernel_03.html.*

Geometric Layout Analysis Techniques for Document..—Cattoni, Coianiz.. (1998) ipml.ee.duth.gr/~papamark/citation/DOC_SEGstate.pdf.*

Textual Information Extraction in the face of Information Deluge—Li Kwang Angela www.comp.nus.edu.sg/labs/chime/paperdownload/wee.ps.*

A Propose-and-revise System for Real-time Traffic Management—Martin Molina Mnica (2000) www.erudit.de/erudit/events/esit2000/proceedings/AD-01-1-1-P.pdf.*

Knowledge-Based Spatiotemporal Linear Abstraction—Shahar, Molina (1998) www-smi-stanford.edu/pubs/SMI_Reports/SMI-97-0703.pdf.*

Intradomain Overlays: Architecture and Applications—Christopher Kommareddy Tuna www.cs.umd.edu/Library/TRs/CD-TR-4501/CS-TR-4501.pdf.* www.PeopleFinderNow.com, Skip Tracing and People Locates, pp. 1-6.

Pace, Andrew "It's A Matter of Privacy", Jun. 2001, The Gale Group.

Wattendorf, George, "Stalking Investigation Strategies", Mar. 2000, FBI Law Enforcement Bulletin, Dialog No. 04717583.

Graham, Robert, Carnivore FAQ (Frequently Asked Questions), www.robertgraham.com/pubs/carnivore-faq.html.

Pitney Bowes Inc. Software Solutions regarding ReUnion™ Data Quality to a New Level dated 1998.

Pitney Bowes Inc. Software Solutions regarding Final Focus™ Your Single Source for Geographic, Demographic and Lifestyle Information dated 1998.

* cited by examiner

SENDER ELECTED MESSAGING SERVICES

CROSS REFERENCE TO RELATED APPLICATIONS

Reference is made to commonly assigned copending patent application Ser. No. 09/818,792 filed herewith entitled "Recipient Elected Messaging Services" in the names of Ronald P. Sansone, Robert A. Cordery and Donald G. Mackay; Ser. No. 09/817,998 filed herewith entitled "Messaging Services For The Visually Impaired" in the name of Ronald P. Sansone; Ser. No. 09/818,800 filed herewith entitled "Messaging Services For Uniquely Identified Mail" in the name of Ronald P. Sansone; Ser. No. 09/818,480 filed herewith entitled "Recipient Elected Messaging Services For Mail That Is Transported In Trays Or Tubs" in the name of Ronald P. Sansone; Ser. No. 09/818,195 filed herewith entitled "Method For Determining If Mail Contains Life Harming Materials" in the name of Ronald P. Sansone; Ser. No. 09/818,277 filed herewith entitled "Method For A Carrier To Determine The Location Of A Missing Person" in the name of Ronald P. Sansone.

FIELD OF THE INVENTION

The invention relates generally to the field of mail delivery systems and, more particularly, to systems that may deliver mail by physical and/or electronic means.

BACKGROUND OF THE INVENTION

People have directly transmitted information from one person to another. Information was first transmitted by spoken word and later by written word. Writings enabled people to transmit information by messengers from a location in which the sender of the writing was present to another location where the receiver was present. In time, postal services were developed in which a person would deliver a letter to the post office in one city, and an agent of the post office would deliver that letter to a post office in another city, where the letter would be picked up by the person to whom the letter was sent.

Ever since the numeric codification of streets and buildings received general acceptance, an individual's name and the individual's household postal address have been linked. The sender of a letter or package would deliver a letter or package to the post that had the correct recipient postal address, and the post would deliver the letter or package to the numeric street address of the recipient of the letter or package. A correct recipient postal address for the delivery of the letter or package to the recipient included the name of the recipient; the street address of the recipient; the city and state of the recipient; and the zip code of the recipient. Thus, the correct recipient postal address is usually the actual location of the recipient.

Sometimes senders of letters, flats and packages like to know where the recipient letters and packages are in the delivery stream. For instance, if someone is shipping goods, bills, documents, dated material, etc. to different areas, they may want to know if there are any problems delivering the letters, flats and/or packages. Someone may also want to speed up or slow down the delivery of a letter, flat or package that is in the delivery stream. The sender may want to redirect the letter, flat and/or package, because the recipient wants the letter, flat and/or package sent to a different address. The sender may want the letter, flat and/or package back because the recipient does not pay its bills, or the recipient is bankrupt. The sender may also want to make sure that the recipient can not divert the sending of the letter, flat and/or package to a different address; e.g., the letter, flat and/or package may contain legal documents.

SUMMARY OF THE INVENTION

This invention overcomes the disadvantages of the prior art by providing a method that enables the recipient to receive notification of the letters, flats and/or packages (mail) that the recipient is going to receive prior to the delivery of the mail. The recipient is then able to inform a post or courier e.g., Federal Express®, Airborne,® United Parcel Service®, DHL®, etc., of the manner in which the recipient would like the mail delivered if it is acceptable to the sender. The post and courier hereinafter will be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the carrier e-mail or fax the contents of the mailpiece to the recipient and/or parties designated by the recipient. The foregoing recipient elections will only be allowable if the sender elects to permit the recipient to divert the mail.

This invention accomplishes the foregoing by depositing with the carrier mail containing the recipient's name and physical address and the sender's name and address; capturing an image of the name and physical address of the recipient and the sender; translating an image of the name and physical address of the recipient into an e-mail address; notifying the recipient via e-mail of the availability of the deposited mail; notifying the carrier, via e-mail, of the manner in which the recipient would like the mail delivered; and delivering mail to the recipient in the manner specified by the recipient to the carrier, if the sender elects to permit the recipient to divert the mail.

DETAILED DESCRIPTION OF THE PREFERRED EMBODIMENT

Figure 1A:
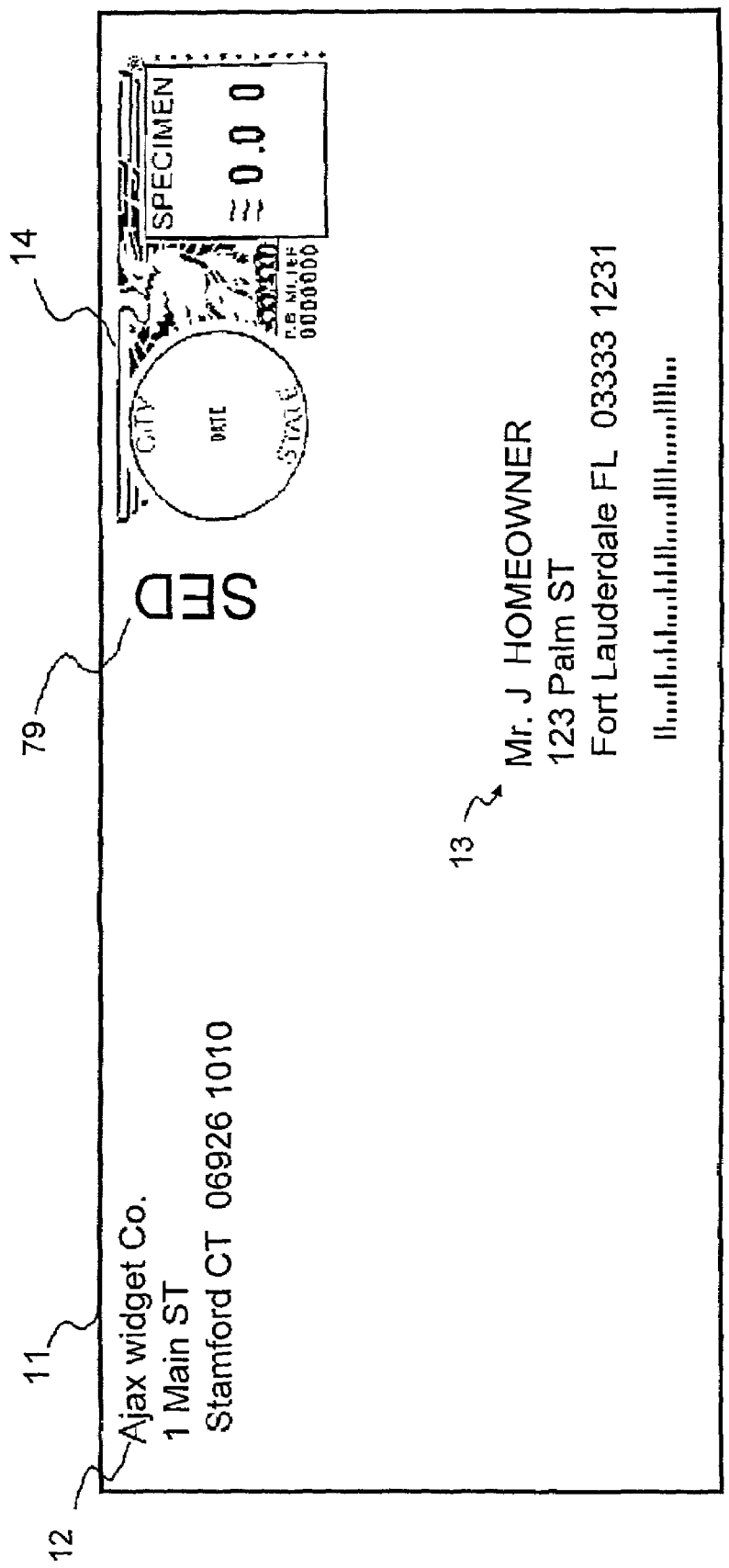
FIG. 1A is a drawing of a metered mailpiece.

Referring now to the drawings in detail and more particularly to FIG. 1A, the reference character 11 represents a mailpiece that has a sender address field 12; a recipient address field 13; a postal indicia 14; and an indication 79 from the sender to the post specifying that the sender wants the mailpiece to be delivered and the mailpiece should not be diverted.

Figure 1B:
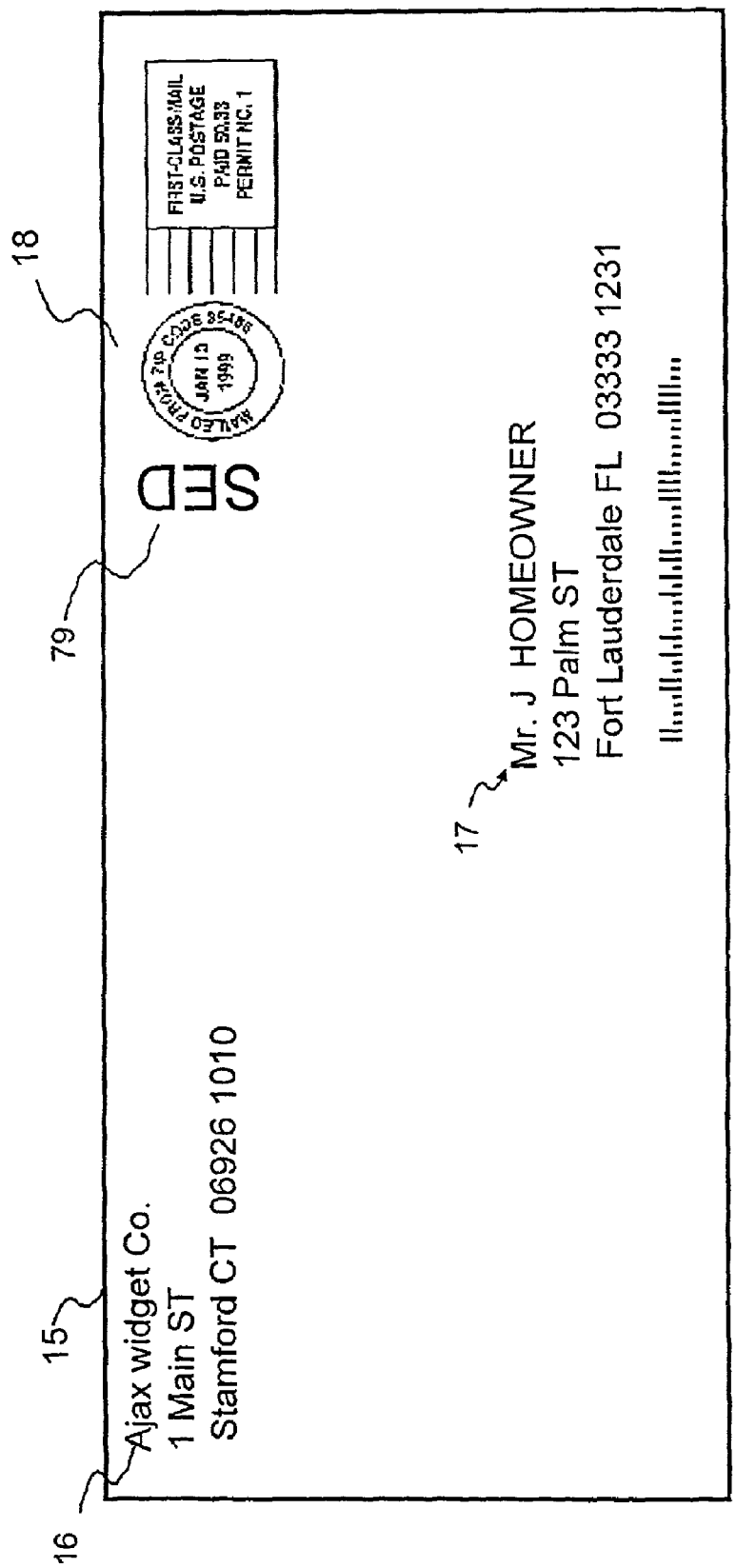
FIG. 1B is a drawing of a permit mailpiece.

FIG. 1B is a drawing of a permit mailpiece. Mailpiece 15 has a sender address field 16; a recipient address field 17; a permit 18; and a indication 79 from the sender to the post specifying that the sender wants the mailpiece to be delivered and the mailpiece should not be diverted.

Figure 1C:
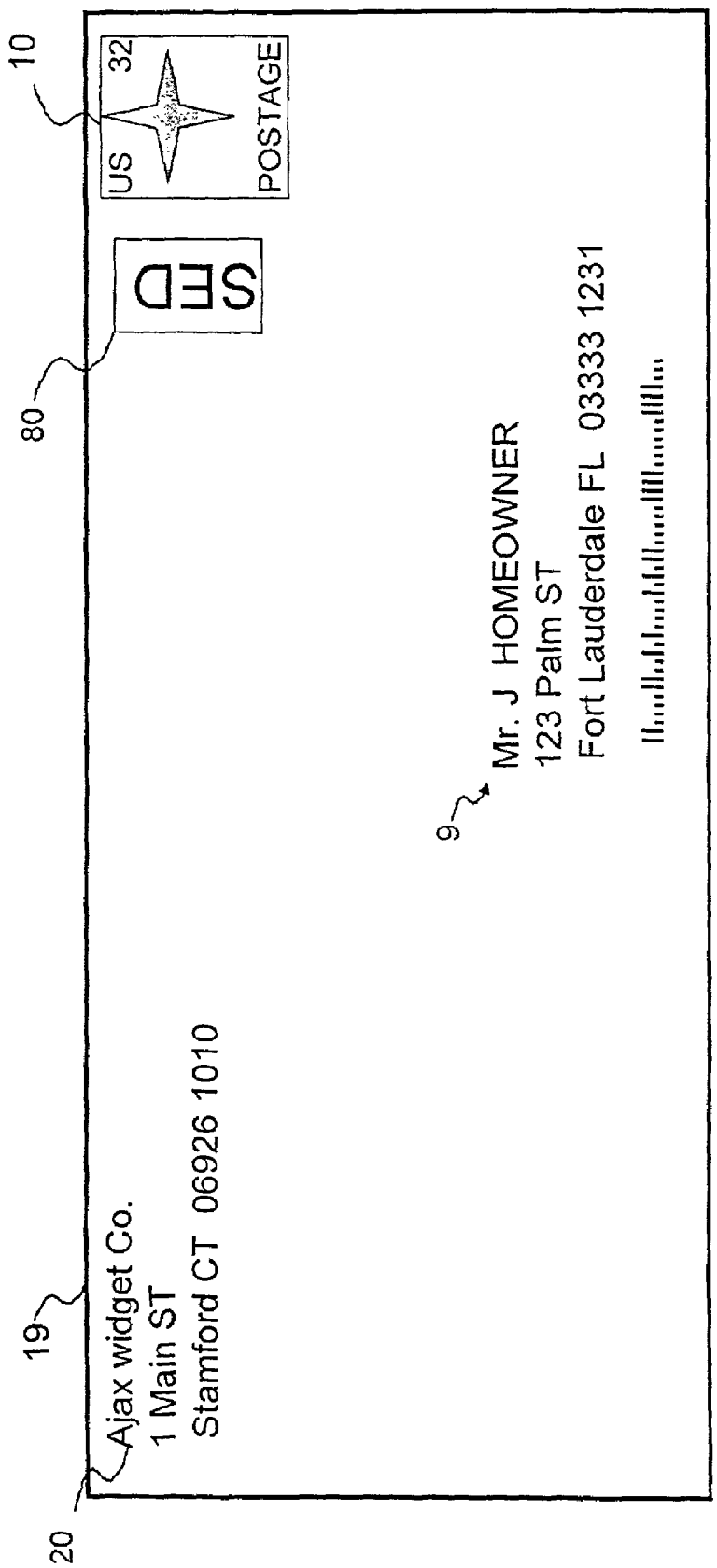
FIG. 1C is a drawing of a stamped mailpiece.

FIG. 1C is a drawing of a stamped mailpiece. Mailpiece 19 has a sender address field 20; a recipient address field 9; a stamp 10; and an indication 80, in the form of a label, from the sender to the post, specifying that the sender wants the mailpiece to be delivered and the mailpiece should not be diverted.

Figure 1D:
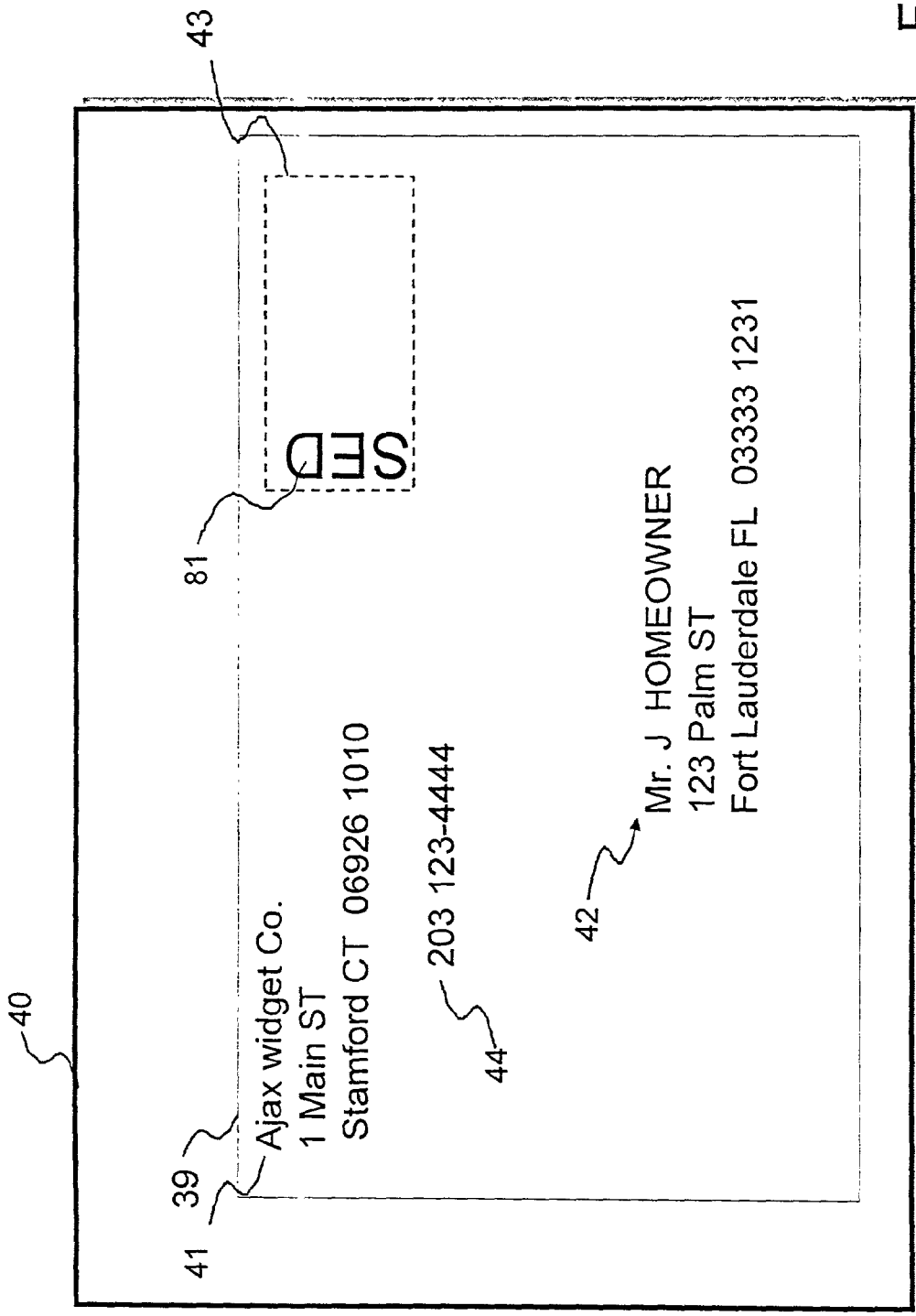
FIG. 1D is a drawing of a flat or package that is going to be delivered by a carrier.

FIG. 1D is a drawing of a flat or package that is going to be delivered by a carrier. Package 40 has a label 39 affixed thereto. Label 39 has a sender address field 41; a recipient address field 42; and an indication 81 from the sender to the post specifying that the sender wants the mailpiece to be delivered and the mailpiece should not be diverted. Label 39 may have other sender information, e.g., the sender's phone number 44. Indicia 43 is affixed to label 39. Indicia 43 may be a postal indicia or courier symbology.

FIGS. 1A–1D show various methods of evidence for the payment of postage. It will be obvious to one skilled in the art that additional methods of evidence for the payment of postage exist.

Figure 2:
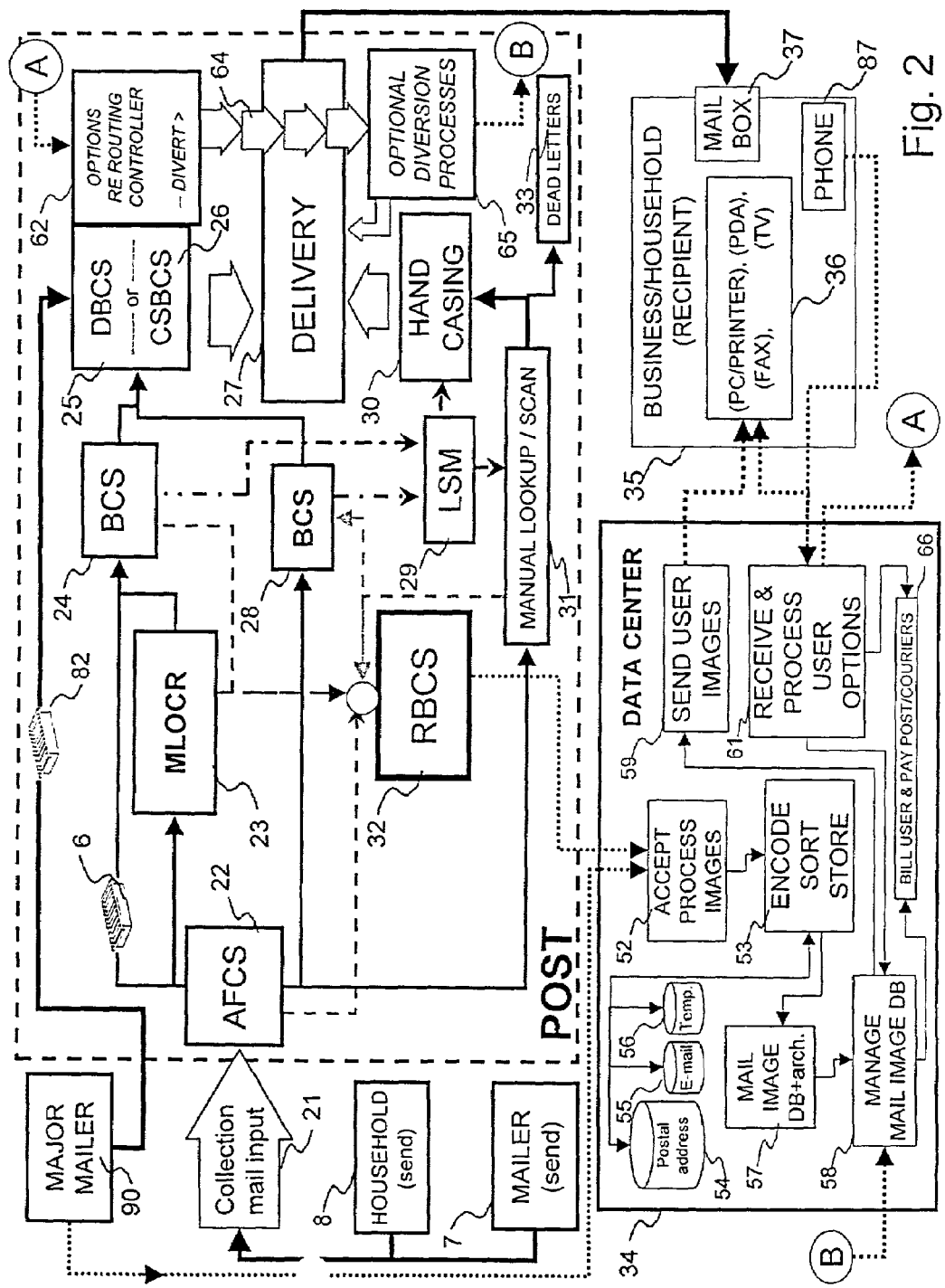
FIG. 2 is a drawing showing how this invention may be used by a post in the processing of letter mail.

FIG. 2 is a drawing showing how this invention may be used by a post in the processing of letters. Letter mail that is deposited in trays 6 and delivered to the post is read by multiple optical character reader ("MLOCR") 23. Collection letter mail may be: metered letter mail that is produced at a mailer site 7 or a sender household 8 by a postage meter or a personal computer meter; stamped mail; or permit mail. Collection letter mail is placed in collection mail input 21, e.g., mail boxes or delivered to the United States Postal Service, unsorted. Collection letter mail is sent to advanced facer canceller ("AFCS") 22. AFCS 22 first faces the letter mail. Then AFCS 22 electronically identifies and separates prebarcoded mail, handwritten addresses and machine-imprinted address pieces for faster processing through automation. Letter mail that 22 determines is optical character readable is sent to multi-line optical character reader/code printer ("MLOCR") 23. MLOCR 23 reads the entire address on the letter mail; sprays a bar code on the mail; and then sorts the mail. Letter mail that is able to be scanned and sorted by MLOCR 23 is sent to bar code sorter/code printer ("BCS") 24. Letter mail that the mailer has prebarcoded and contains a facing identification mark is sent to BCS 24.

Trayed mail 82 (mail in which the sender is entitled to discounts) that is produced at a major mailer site 90 (FIG. 5) is sent to a delivery bar code sorter/code printer ("DBCS") 25 or a carrier sequence bar code sorter/code printer ("CS-BCS") 26. Sorters 25 and 26 sort the letter mail in the order that the mail is going to be delivered by postal carrier 27. Letter mail that AFCS 22 determines is not optical character readable is sent to bar code sorter/code printer 28. Letter mail that AFCS 22 obtains electronic images from and letter mail that MLOCR 23 obtains electronic images from transfers the electronic images to remote bar code system ("RBCS") 32. RBCS 32 matches the looked-up zip code for the letter mailpieces from AFCS 22 and merges them. RBCS 32 electronically transmits the bar code information to BCS 28 where the bar code information is sprayed on the mailpieces. Letter mail that is able to be scanned and sorted by sorters 24 and 28 is sent to a delivery DBCS 25. Sorters 25 and 26 sort the letter mail in the order that the mail is going to be delivered by postal carrier 27, or hold the mail for recipient diversion for a specified period of time in divert mail options rerouting controller 62.

Letter mail that can not be scanned and sorted by sorters 24 and 28 is sent to letter mail sort machine ("LSM") 29. Letter mail that can be sorted by LSM 29 is sent to postal hand casing 30. Postal hand casing 30 is the process in which the postal carrier sorts the letter mail in the order that the letter mail is going to be delivered by postal carrier 27. Letter mail that can not be sorted by LSM 29 is sent to manual lookup/scan 31. Manual lookup/scans 31 attempts to classify the previously rejected mailpiece to redirect the mailpiece; declare the mailpiece dead; or manually re-code the mailpiece for redelivery. Then the mailpieces that have not been processed in manual lookup/scan 31 are sent to dead letters 33. In manual lookup/scan 31, an operator may determine the address of the recipient and produce a label to be placed on the letter mail. Then the letter mail would go to postal hand casing 30 where the mail is sorted in the order that the mail is going to be delivered by postal carrier 27.

Letter mail that can not be faced and cancelled by AFCS 22 is sent to manual lookup/scan process 31. Manual lookup/scan 31 attempts to classify the previously rejected letter mailpiece to redirect the mailpiece; declare the mailpiece dead; or manually re-code the mailpiece for redelivery. Then the letter mail that manual lookup/scan 31 is able to classify is sent to postal carrier hand casing 30 before it is delivered by postal carrier 27.

Coded video system ("RBCS") 32 electronically transmits the bar code information that represents the destination of the letter mailpiece and the party to whom the mailpiece is to be delivered and the image of the face of the mailpiece to data center 34. The aforementioned scanners scan all of the information appearing on the face of the letter mail, e.g., the sender's name and address 12 (FIG. 1A), the recipient's name and address 13, postal indicia 14 and indication 79. The scanned information is transferred to accept process images 52. Then the information is sent to encode, sort, store 53. At this point, the recipient's physical address is verified by checking postal address database 54 and the recipient's e-mail address is determined from e-mail database 55. Temporary database 56 is then searched to determine whether or not the recipient has left any forwarding addresses. Encode, sort, store 53 then encodes and sorts the information obtained from databases 54, 55 and 56.

The aforementioned encoded and sorted information is stored in mail image database+archive 57. Then the mail image information is sent to manage mail image DB 58 where the various options and the costs associated therewith that the recipient may have for delivering the information contained in the letter mail is determined. Then the mail images and options that the recipient has for receiving the letter mail from manage mail DB 58 and mailpiece image store and forward 99 (FIG. 5) is sent to send user images 59. The information appearing on the face of the letter mail in alphanumeric and graphic form and the options in alphanumeric and graphic form that the recipient has for receiving the letter mail are transmitted to receiving device 36 (personal computer, television, facsimile machine, personal data assistant, etc.), which is located at the recipient's business or household 35. The options that the recipient has for diverting the letter mail is described in the description of FIG. 4. If the sender placed an indication 79 or 80 on the mailpiece, the post will deliver the mailpiece in the manner selected by the mailer and not divert the mailpiece.

The recipient may use device 36 (personal computer, facsimile machine, personal data assistant, etc.) located at the recipient's business or household 35 to inform, receive, and process user options 61, located at data center 34, of the manner in which the letter mail should be delivered. The recipient may also use a touch tone and/or voice telephone 87 to inform receive & process user options 61 of the manner in which the recipient would like the letter mail displayed on the receiving device 36, e.g., television delivered. It would be obvious to one skilled in the art that additional communication devices may be used by the recipient to communicate with the carrier. For instance, the recipient may want the letter mail physically delivered to the recipient's house faster or slower, or the letter mail physically redirected to the recipient's temporary address, or physically delivered to the recipient's agent, or physically delivered to the recipient's attorney, or physically returned to the mailer, or have the post open the letter mail and have the post e-mail or fax the contents of the letter mail to the recipient and/or parties designated by the recipient. If the sender placed a indication 79 or 80 on the mailpiece, the post will deliver the mailpiece in the manner selected by the mailer and not divert the mailpiece.

At this juncture the recipient may inform receive & process user options 61 via a device 36 of the manner in which the recipient would like the letter mail processed. Options 61 will then inform the recipient via device 36 of the cost to the recipient to process the letter mail in the manner selected by the recipient. The recipient may then inform the post to deliver the letter mail in the manner selected by the recipient. The recipient's selected manner of letter mail processing is forwarded to options rerouting controller 62. If the post-specified time to deliver the letter mail has not been reached, the letter mail is sent to recipient options 64 and delivered in the manner selected by the recipient in optional diversion processes 65. Then optional diversion process 65 informs manage mail db 58 to archive the image and also to notify bill sender and pay carriers 66 to bill the recipient and pay the post. At this point, the next letter mail image is ready to be processed.

The letter mail may then be delivered to the recipient at mail box 37 at a faster or slower rate than that selected by the sender; held by the post for a specified amount of time and then delivered to a address specified by the recipient; opened, and the contents of the letter mail faxed to recipient-selected fax numbers; opened, and the contents of the letter mail faxed to recipient-selected fax numbers, and then the letter mail may be delivered to the physical address specified by the recipient; opened, and the contents of the letter mail e-mailed to recipient-selected e-mail addresses; or opened, and the contents of the letter mail e-mailed to recipient-selected e-mail addresses, and then the letter mail may be delivered to the physical address specified by the recipient. The recipient may also have instructed the post to return the mail to the sender, to destroy the mail, or to recycle the paper in the letter mail. Receive & process user options 61 will also send the cost of the recipient-selected manner of delivery to bill user & pay post/couriers 66 so that the post may debit the recipients account or send a bill to the recipient.

Figure 3:
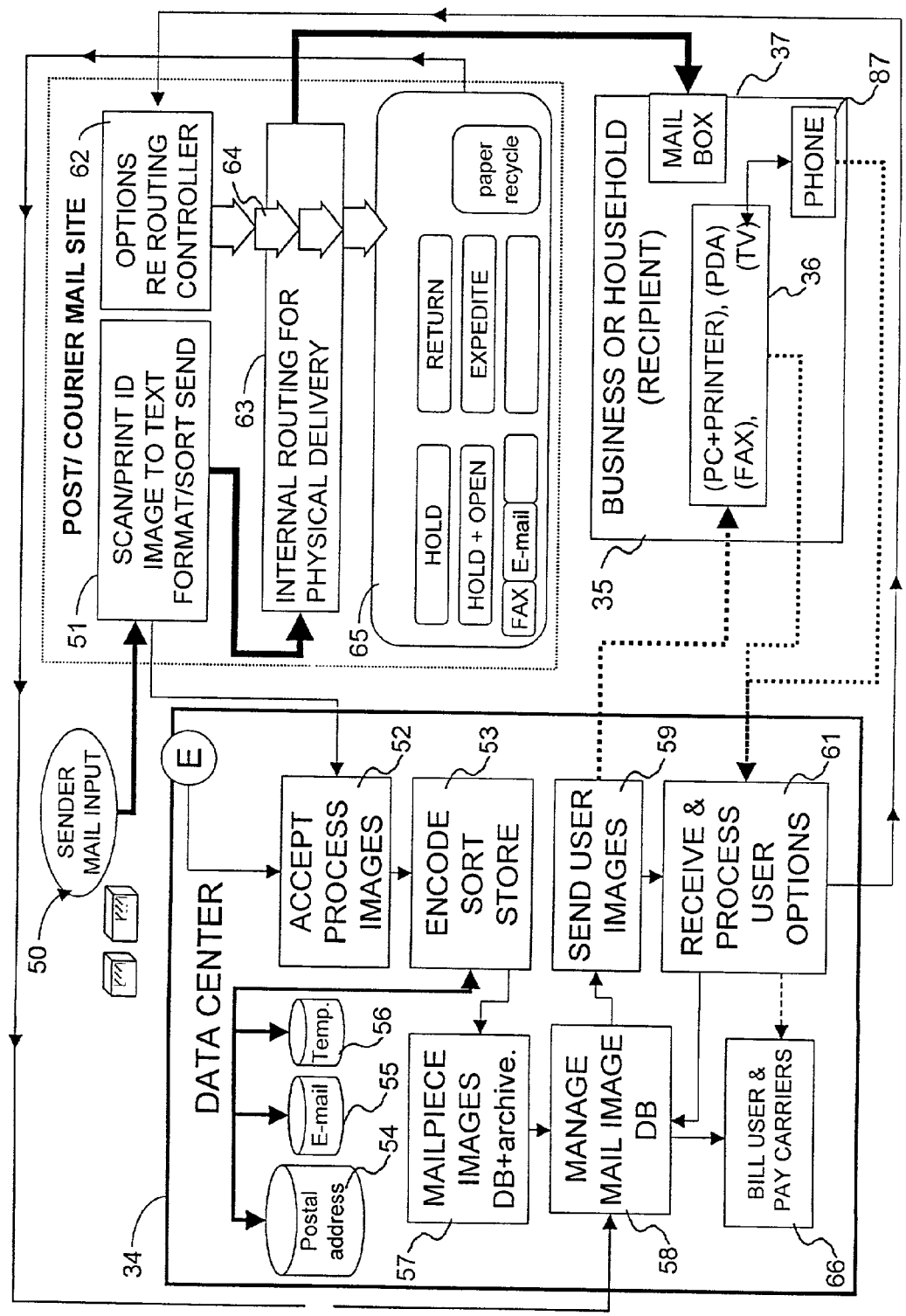
FIG. 3 is a drawing showing how this invention may be used by the post and/or a courier in the processing of flats and packages.

FIG. 3 is a drawing showing how this invention may be used by a post or courier in the processing of packages and flats. Packages and flats that are deposited with the carrier at 50 are scanned by scanner/coder 51. Scanner/coder 51 scans all of the information appearing on the face of the package or flat, e.g., the sender's address 41 (FIG. 1D); the sender's phone number 44; the recipient's address 42 and courier symbology 43. The scanned information is coded, formatted and sorted, and the physical flat or package is sent to internal routing for physical delivery of the package or flat 63. The aforementioned information is transferred to accept process images 52, which is located at data center 34. Then the information is sent to encode, sort, store 53. At this point, the recipient's physical address is verified by checking postal address database 54, and the recipient's e-mail address is determined from e-mail database 55. Temp db 56 is then searched to determine whether or not the recipient has left any forwarding addresses. Encode sort store 53 then encodes and sorts the information obtained from databases 54, 55 and 56.

The aforementioned encoded and sorted information is stored in mailpiece images db+archive. 57. Then the package or flat image information is sent to manage mail image 58 where the various options and the costs associated therewith, that the recipient may have for delivering the information contained in the package or flat are determined. Then the mail images and options that the recipient has for receiving the package or flat are sent to send user images 59, where the information appearing on the face of the package or flat in alphanumeric and graphic form and the options in alphanumeric and graphic form the recipient has for receiving the package or flat are transmitted to receiving device 36 (personal computer+printer [PC], television [TV], facsimile machine [FAX], personal data assistant [PDA], etc.), which is located at the recipient's business or household 35. The recipient may use device 36 (personal computer+printer (PC), television (TV), facsimile machine (FAX), personal data assistant (PDA), etc.) located at the recipient's business or household 35 to inform receive and process user options 61, located at data center 34, of the manner in which the package or flat should be delivered. The recipient may also use a touch tone and/or voice telephone 87 to inform receive & process user options 61 of the manner in which the recipient would like the package or flat displayed on the receiving device 36, e.g., television delivered. For instance, the recipient may want the package or flat physically delivered to the recipient's house faster or slower, or the package or flat physically redirected to the recipient's temporary address, or physically delivered to the recipient's agent, or physically delivered to the recipient's attorney, or physically returned to the mailer, or have the post open the package or flat and have the post e-mail or fax the contents of the package or flat to the recipient and/or parties designated by the recipient. If the sender placed a statement 81 on the flat or package, the carrier will deliver the mail in the manner selected by the mailer and not divert the mailpiece.

At this juncture, the recipient may inform receive & process user options 61 via a device 36 of the manner in which the recipient would like the package or flat processed. Receive & process user options 61 will then inform the recipient via device 36 of the cost to the recipient to deliver the package or flat in the manner selected by the recipient. The recipient may then inform the carrier to deliver the package or flat in the manner selected by the recipient. The recipient's selected manner of package or flat delivery is forwarded to options rerouting controller 62. If the carrier specified time to deliver the package or flat has not been reached or the package or flat is at internally routing for physical processing 63, the package or flat will be sent to recipient options 64 and delivered in the manner selected by the recipient in route mail options 65. Then route mail options 65 informs manage mail image db 58 to archive the image and also to notify bill user and pay carriers 66 to bill the recipient and pay the carrier. At this point, the next package or flat image is ready to be processed.

The package or flat may then be delivered to the recipient at mail box 37 at a faster or slower rate than that selected by the sender; held by the courier for a specified amount of time and then delivered to a address specified by the recipient;

opened, and the contents of the package or flat faxed to recipient selected fax numbers; opened, and the contents of the package or flat faxed to recipient selected fax numbers, and then the package or flat may be delivered to the physical address specified by the recipient; opened and the contents of the package or flat e-mailed to recipient selected e-mail addresses; or opened, and the contents of the package or flat e-mailed to recipient selected e-mail addresses, and then the package or flat may be delivered to the physical address specified by the recipient. The recipient may also have instructed the post or courier to return the mail to the sender or to destroy the contents of the package or flat or recycle the contents of the package or flat. Receive & process user options 61 will also send the cost of the recipient selected manner of delivery to bill user & pay carriers 66 so that the carrier may debit the recipients account or send a bill to the recipient.

Figure 4:
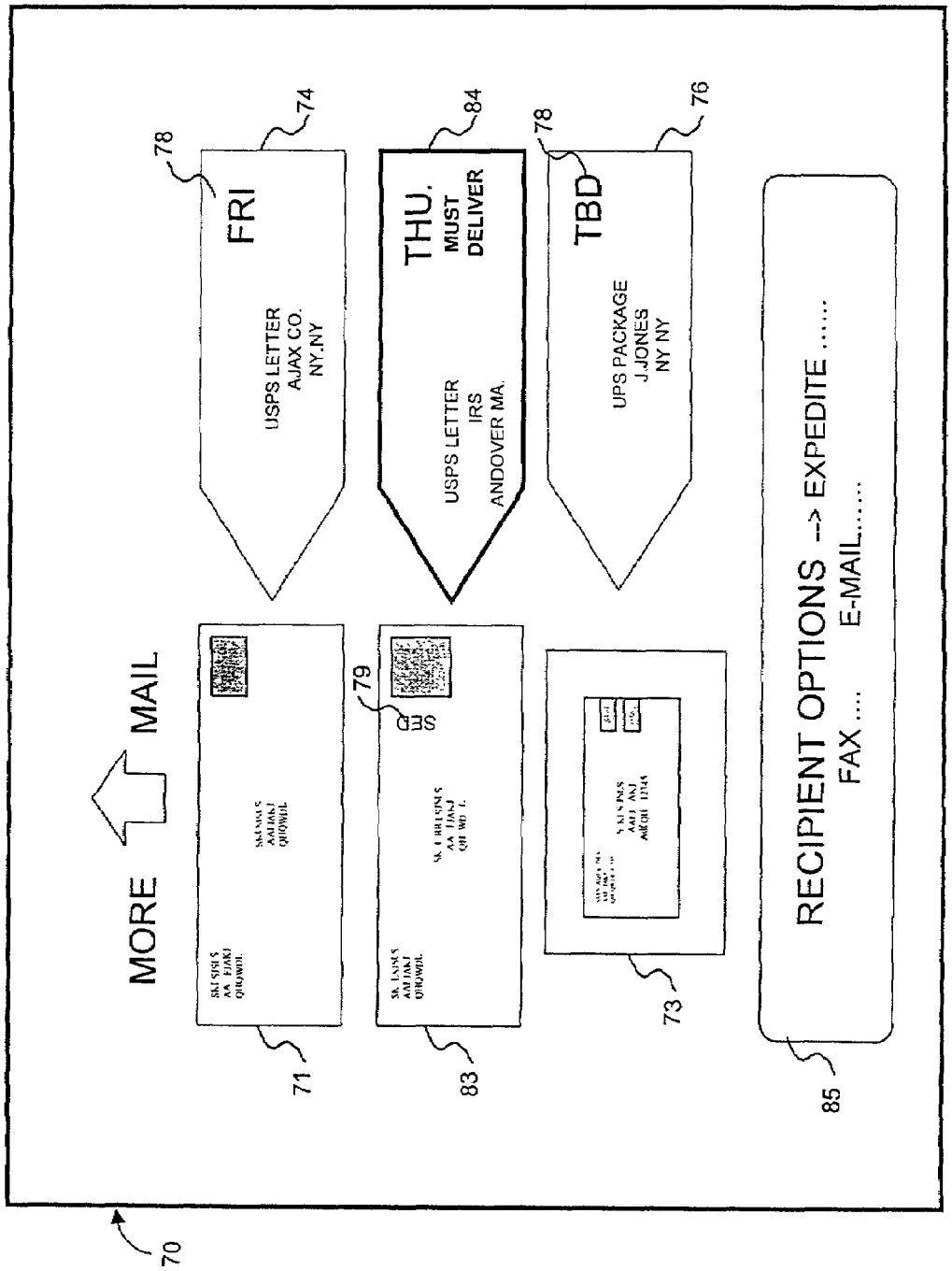
FIG. 4 is a drawing of the information that appears on one or more of receiving devices 36.

FIG. 4 is a drawing of the information that appears on one or more of receiving devices 36. The information may appear on the display of a personal computer, the screen of a television set, or paper 70 printed by a printer or facsimile machine. An image of the face of a letter mail is shown at 71 and 83 and a image of the face of a flat or package is shown at 73. Data associated with letter mail 71 is shown at 74 and data associated with letter mail 83 is shown at 84. Since indication 79 appears on letter mail 83 data 84 indicates that the carrier must deliver letter mail 83. Data associated with package or flat 73 is shown at 76. The options that the recipient has for diverting letter mail 71 and package or flat 73 is shown at 85 and the time that the recipient would like delivery is shown at 78.

Figure 5:
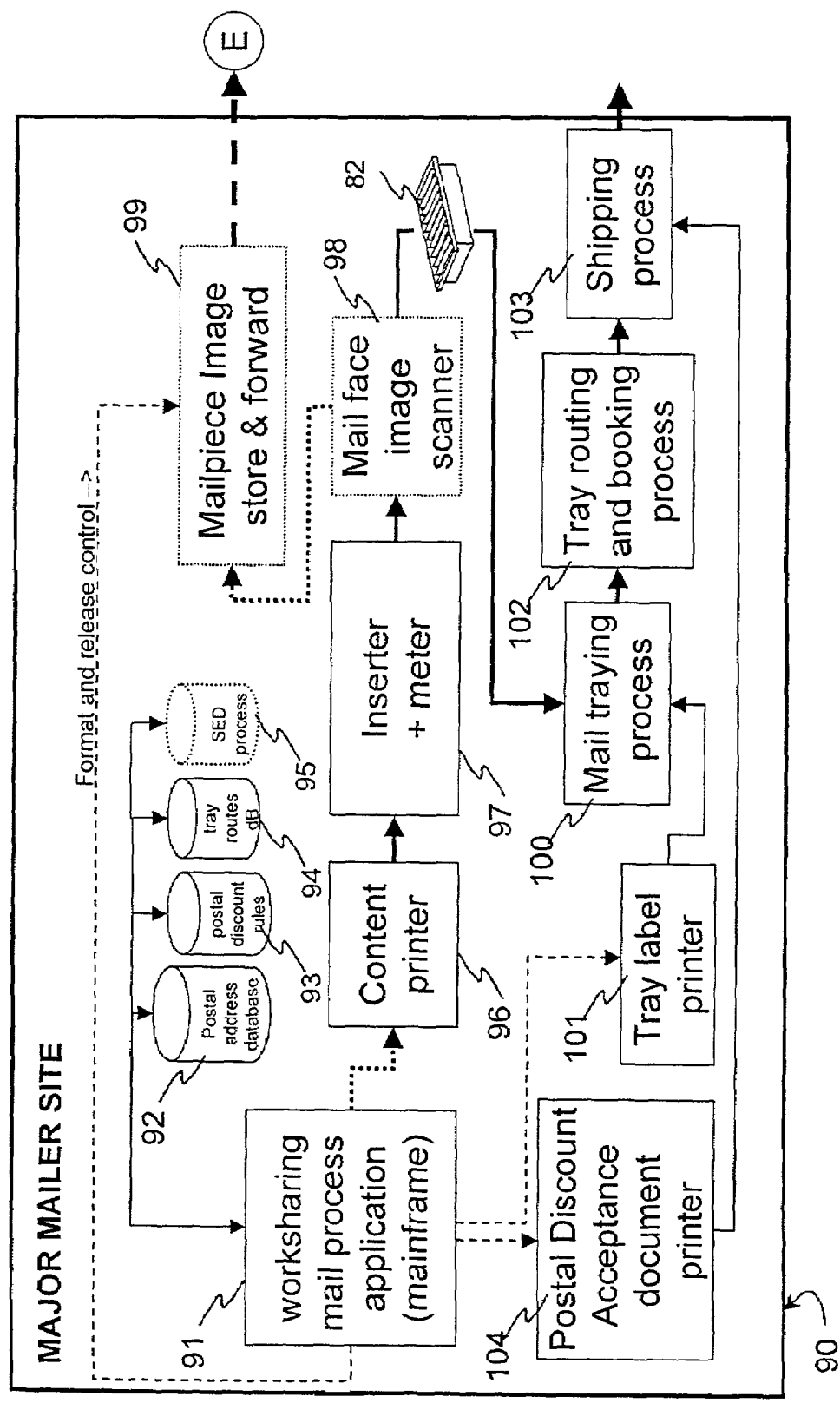
FIG. 5 is a drawing of major mailer site 90.

FIG. 5 is a drawing of major mailer site 90 that is used in the production of mailpieces for tray 82 (shown in FIG. 2). A mainframe 91 is located at site 90. Mainframe 91 performs preprocessing of the mailpiece by controlling the content and composition of the mailpiece as well as the address management, presortation postal requirements and postal process bar code requirements. Mainframe 91 is coupled to postal address database 92, postal discount rules 93, tray routes database 94, and SED process 95. Mainframe 91 utilizes postal address database 92, postal discount rules 93, tray routes database 94 and SED process 95 to instruct content printer 96 to print the material that is required for the mailing, e.g., information appearing on the face of the mailpiece; and material that is going to be inserted into the mailpiece. Inserter and meter 97 inserts the material into the correct mailpiece, seals the mailpiece, applies the correct postage to the mailpiece, places the mailpiece in the proper tray 82 and prepares documentation for the mailpieces in tray 82. Mail face image scanner 98 scans the images on the face of each mailpiece as inserter and meter 97 is traying the mailpieces. Then mail face image scanner 98 forwards the scanned images to mailpiece image store & forward 99. Mainframe 91 will cause tray label printer 101 to print a label according to mail traying process 100 for the tray 82 that inserter and meter 97 is filling when the tray 82 is filled and process 100 receives complete tray inputs from mail face image scanner 98. Then the tray 82 containing the mailpieces goes to tray routing and booking process 102 and shipping process 103. When tray 82 is in shipping process 103, postal discount acceptance document printer 104 will be instructed by mainframe 91 to print the proper postal documentation for the mailpieces in tray 82. After process 103 places the proper documentation in trays 82, they are ready to be shipped to DBCS 25 or CSBCS 26 (FIG. 2).

The above specification describes a new and improved method that enables a recipient to inform a carrier of the manner in which the recipient would like the mail delivered if the sender elects to permit the recipient to divert the mail. It is realized that the above description may indicate to those skilled in the art additional ways in which the principles of this invention may be used without departing from the spirit. Therefore, it is intended that this invention be limited only by the scope of the appended claims.

What is claimed is:

1. A method utilizing a computer system that enables a recipient to inform a carrier of the manner in which the recipient would like the mail delivered, said method comprises the steps of:

depositing with the carrier physical mail containing the recipient's name and physical address and the sender's name and address;

capturing by electronic and optical means the name and physical address of the recipient and the sender from the physical mail;

translating the name and physical address of the recipient into an e-mail address; by checking a postal address database and the recipient's e-mail database;

notifying the recipient electronically by the recipient of the availability of the deposited physical mail;

notifying the carrier electronically by the carrier of the manner in which the recipient would like the physical mail delivered;

notifying the carrier that the sender wants the deposited physical mail to be delivered directly to the recipient or that the sender elects to permit the recipient to divert the physical mail; and delivering physical mail to the recipient by the carrier in the manner specified by the recipient to the carrier, if the sender elects to permit the recipient to divert the physical mail.

2. The method claimed in claim 1, wherein the sender places an indication on the physical mail specifying that the physical mail should not be diverted by the recipient.

3. The method claimed in claim 2, further including the step of:

charging the sender for placing an indication on the physical mail specifying that the physical mail should not be diverted by the recipient.

4. The method claimed in claim 1, wherein the sender places an indication on the physical mail specifying that the physical mail should be delivered only as specified by the sender.

5. The method claimed in claim 4, further including the step of:

charging the sender for placing an indication on the physical mail specifying that the physical mail should be delivered only as specified by the sender.

6. The method claimed in claim 1, wherein the recipient notifies a data center who notifies the carrier of the manner in which the recipient would like the physical mail delivered.

* * * * *